United States Patent Office 2,831,849
Patented Apr. 22, 1958

2,831,849

AZO-DYESTUFFS

Walter Hanhart, Riehen, Switzerland, and Paul Dreyfuss, Cincinnati, Ohio, assignors to Ciba Limited, Basel, Switzerland, a Swiss firm No Drawing. Application October 12, 1954
Serial No. 461,939

Claims priority, application Switzerland October 23, 1953

13 Claims. (Cl. 260—148)

This invention provides new azo-dyestuffs which like, for example, the dyestuff of the formula (1)

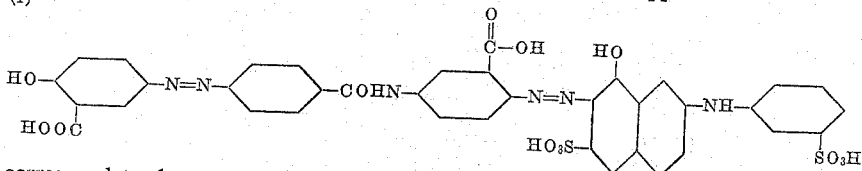

correspond to the general formula (2)

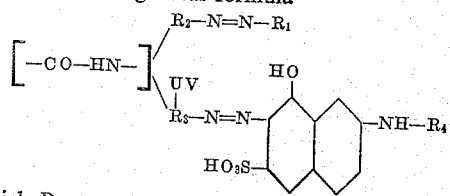

in which $R_1$ represents the radical of a hydroxybenzene-orthocarboxylic acid, $R_2$ and $R_3$ represent benzene radicals in which the carbon atoms bound to the azo linkage and the [—CO—NH—] group are separated from one another by at least one carbon atom, $R_4$ represents a benzene radical containing a substituent imparting solubility in water, and UV represents a hydroxyl group, carboxylic acid group or alkoxy group in ortho-position relatively to the azo linkage. The invention also provides complex copper compounds of the dyestuffs of the Formula 2.

The invention also provides a process for making the dyestuffs of the Formula 2 wherein in a suitable order of succession starting materials which yield radicals corresponding to the formulae $$R_1-, \quad -R_2-, \quad -\overset{UV}{\underset{|}{R_3}}-$$

and

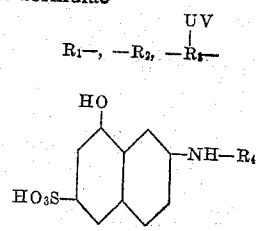

and conforming with the above definitions, are reacted together and the radicals $R_2$ and $R_3$ are linked together by a [—CO—HN—] group. If desired, the products at a stage in which they are capable of being metallized are treated with an agent yielding copper.

In one form of the process for making the new dyestuffs a diazo-compound of an aminoazo-dyestuff of the formula (3)

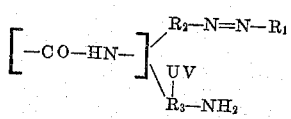

in which $R_1$ represents the radical of a hydroxybenzene-orthocarboxylic acid, $R_2$ and $R_3$ represent benzene radicals in which the carbon atoms bound to the azo linkage or amino group and the [—CO—HN—] group are separated from one another by at least one carbon atom, and UV represents a hydroxyl group, carboxylic acid group or alkoxy group in ortho-position relatively to the amino group, is coupled with a compound of the formula

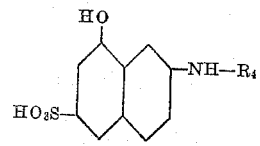

in which $R_4$ represents a benzene radical containing a group imparting solubility in water, and, if desired, the dyestuff so obtained is treated with an agent yielding copper.

As is evident from the foregoing description the dyestuffs of the Formula 2 can be prepared either from diazo compounds of amino-azo-dyestuffs of the formula (4) 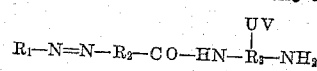

or from diazo-compounds of amino-azo-dyestuffs of the formula (5) 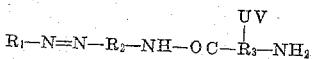

The amino-azo-dyestuffs of the Formula 4 are obtainable, for example, by coupling a tetrazo-compound of a diamine of the constitution (6) 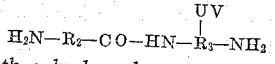

on one side with a hydroxybenzene-orthocarboxylic acid ($R_1$—H) capable of coupling. As such coupling components there may be mentioned, for example, 6-chloro- or 6-methyl-1-hydroxybenzene-2-carboxylic acid, and especially 1-hydroxybenzene-2-carboxylic acid itself. In the diamines of the Formula 6 the carbon atoms of the benzene radicals $R_2$ and $R_3$ which are bound to the amino group and the —CO—HN— group are each separated from one another by at least one ring carbon atom, that is to say, the amino groups must not be present in ortho-position relatively to the —CO—HN— group. It is of advantage that these two groups, at least in the case of the radical $R_3$, should be in para-position relatively to one another, and especially good results are obtained with those diamines in which both amino groups are in para-position relatively to the —CO—HN— group.

As diamines of the Formula 6 there may be used, for example, 1-amino-4-(4'-aminobenzoylamino)-benzene-2-carboxylic acids in which both benzene nuclei may contain further substituents, for example, a lower alkyl group or a halogen atom. As further suitable diamines there may be mentioned, 1-amino-4-(3'-aminobenzoylamino)-benzene-2-carboxylic acid, 1-amino-4-(4'- or -3'-aminobenzoylamino)-2-hydroxybenzene, 1-amino-4-(4'- or -3'-aminobenzoylamino)-2-methoxybenzene, 1-amino-4-(3'-methyl- or 3'-chloro-4'-amino-benzoylamino)-benzene-2-carboxylic acid and 1-amino-4-(3'-methyl- or 3'-chloro-4'-aminobenzoylamino)-2-hydroxy- or methoxybenzene. The diamines of the Formula 6 may be tetrazotized by methods in themselves known, for example, by means of hydrochloric acid and sodium nitrite. The tetrazo-compounds so obtained are then coupled with the hydroxybenzene orthocarboxylic acid, advantageously in an alkaline medium.

The amino-azo-dyestuffs of the Formula 5 are obtained by condensing a compound of the formula (7) 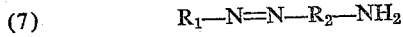

(also an amino-azo-dyestuff) with an acid halide of the formula (8) 

in which $R_3$ represents a benzene radical, and UV represents a hydroxyl group, an alkoxy group or a carboxylic acid group, the group UV being in ortho-position relatively to the nitro group and the acid halide group being in other than ortho-position relatively to the nitro group (advantageously the groups —$NO_2$, —UV— and halogen —OC— are in 4:3:1-position), and then reducing the nitro group to an amino group. As aminoazo-dystuffs of the Formula 7 there may be mentioned more especially 4 - amino-4'-hydroxy-1:1'-azobenzene-3'-carboxylic acids, which may contain in the radical $R_1$ or advantageously in the radical $R_2$, further substituents. As examples, there may be mentioned, in addition to the unsubstituted compound, 2-methyl-4-amino-5-methoxy-4'-hydroxy-1:1'-azobenzene-3'-carboxylic acid and 2-chloro-4-amino-4'-hydroxy-1:1'-azobenzene-3'-carboxylic acid.

As acid halides of the Formula 8 there are advantageously used 4-nitro-3-alkoxybenzene-1-carboxylic acid chlorides containing alkoxy groups of low molecular weight for example ethoxy or methoxy groups.

The diazo-compounds of the amino-azo-dyestuffs of the Formula 4 or 5 are coupled with 2-phenylamino-8-hydroxynaphthalene-6-sulfonic acids, of which the phenyl radical contains a group inmparting solubility in water, for example, a carboxymethoxy group or advantageously a carboxylic acid or sulfonic acid group. As examples there may be mentioned 2-(2'-methyl-phenylamino)-8-hydroxynaphthalene - 6:4' - disulfonic acid, 2-(4'-methyl-phenylamino)-8-hydroxy-naphthalene-6:3-disulfonic acid, 2 - (4' - chlorophenylamino) - 8 - hydroxynaphthalene-6:3' - disulfonic acid, 2 - (4' - carboxy-methoxyphenyl-amino)-8-hydroxynaphthalene-6-sulfonic acid, 2-phenyl-amino-8-hydroxynaphthalene - 6 - sulfonic acid - 3'-carboxylic acid and 2 - phenylamino - 8 - hydroxynaphthalene-6:3'-disulfonic acid.

Dyestuffs of the Formula 2 and copper compounds thereof can also be obtained by coupling a diazo-compound of an amino-azo-dyestuff of the formula (9) 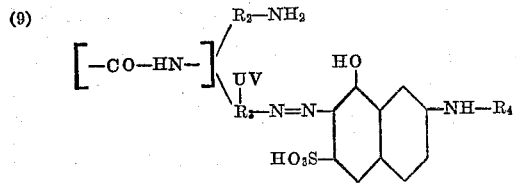

in which $R_2$ and $R_3$ represent benzene radicals in which the carbon atoms bound to the amino group or the azo linkage and the —CO—HN— group are separated from one another by at least one carbon atom, UV represents a hydroxyl group, carboxylic acid group or alkoxy group in ortho-position relatively to the amino-group, and $R_4$ represents a benzene radical containing a group imparting solubility in water, or a diazo-compound of a complex copper compound obtainable from a dyestuff of this constitution, with a hydroxybenzene-ortho-carboxylic acid capable of coupling, and if desired, treating the product so obtained with an agent yielding copper.

Especially suitable for this method of preparation are the amino-azo-dyestuffs of the formula

(10) 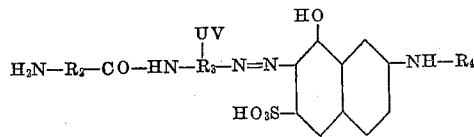

in which $R_2$, $R_3$, $R_4$ and UV have the meanings given above, and which can be obtained by coupling a diazo-compound of an amine of the formula

(11) 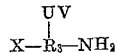

in which $R_3$ represents a benzene radical, and X represents a substituent convertible into an amino group, for example, a nitro or acetylamino group, and this substituent is in a position other than an ortho-position relatively to the amino group and UV is in ortho-position relatively to the amino group, with a 2 - phenylamino - 8 - hydroxy-naphthalene-6-sulfonic acid containing in the phenyl radical a substituent imparting solubility in water, then converting the substituent X into an amino group, acylating the amino-compound with a meta- or advantageously a para-ntirobenzoyl halide, and reducing the nitro group to an amino group.

The amino-azo-dyestuffs of the Formula 10 can also be made by coupling a diazo-compound of a nitro-amine of the formula

(12) 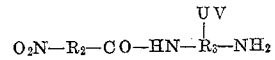

with a 2- phenylamino - 8 - hydroxynaphthalene - 6 - sulfonic acid of the above kind, and then reducing the nitro group to form an amino-acyl group.

The reactions necessary in order to prepare the dyestuffs of the Formula 2 and the intermediate dyestuffs and the other intermediate products mentioned above can all be carried out in known manner. The same applies to the treatment of the intermediate products or final products with an agent yielding copper. The latter treatment is advantageously carried out in such manner that from the ortho-carboxy-ortho'-hydroxy-azo grouping

(13) 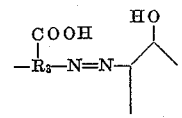

there is formed the ortho-carboxy-ortho'-hydroxy-metal complex of the formula

(14) 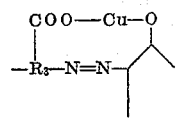

and from the ortho:ortho'-dihydroxy-azo-grouping

(15) 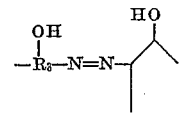

and also from the ortho-alkoxy-ortho'-hydroxy-azo-grouping there is formed the ortho:ortho'-dihydroxy-azo-metal complex of the formula

(16) 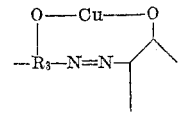

The ortho-hydroxy-ortho'-carboxy- and ortho:ortho'-dihydroxy-azo-dyestuffs may be treated either in a weakly acid medium, for example, with copper sulfate with the addition of sodium acetate or with complex copper amine compounds from ammonia, pyridine, alkylamines or hydroxyethylamines. In the case of ortho-hydroxy-ortho'-methoxy-azo-dyestuffs the last mentioned method is the more suitable.

The metalliferous dyestuffs so obtained correspond to the formula (17)

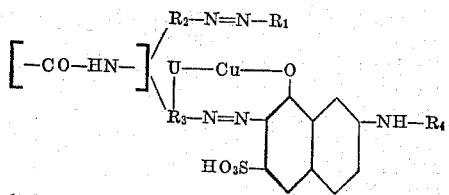

in which $R_1$ represents the radical of a hydroxybenzene-ortho-carboxylic acid, $R_2$ and $R_3$ represent benzene radicals in which the carbon atoms bound to the azo linkage and the [—CO—HN—] group are separated from one another by at least one carbon atom, $R_4$ represents a benzene radical containing a substituent imparting solubility in water, U represents an —O-bridge or —COO— group in ortho-position relatively to the azo linkage.

Depending on the stage at which the coppering is carried out, on the reaction conditions and on the quantity of the agent yielding copper, it is possible to obtain complex copper compounds of which the hydroxybenzene-ortho-carboxylic acid radical $R_1$ also contains a copper atom bound in complex union or in which the radical $R_1$ is free from copper in complex union. If complex copper compounds of the latter kind are to be made, it is of advantage partially to decopper a dyestuff of the kind first mentioned, which contains 2 atoms of copper in complex union, and this decoppering may be carried out, for example, by treatment with hydrochloric acid at a raised temperature.

With regard to the constitution of the cupriferous dyestuffs, the formulae (see, for example, Formula 17) undoubtedly represent the correct stoichiometric quantity of copper and the correct position of the copper atom in the complex, but the distribution of the main and secondary valences in the complex union of the copper has not been established with certainty.

The new dyestuffs of the Formula 2 and the complex copper compounds obtainable therefrom, especially those of the Formula 17, are suitable for dyeing and printing a very wide variety of materials, especially fibers of natural or regenerated cellulose, such as cotton, linen and artificial silk or staple fibers of regenerated cellulose. If the metal-free dyestuffs or only partially metallized dyestuffs (see above) are used for dyeing the treatment with an agent yielding metal, advantageously an agent yielding copper, may be carried out on the fiber or in the dyebath, and if desired partially on the fiber and partially in the dyebath. The dyeings so obtained are distinguished by their very good fastness to light.

The following examples illustrate the invention, the parts and percentages being by weight unless otherwise stated and the relationship of parts by weight to parts by volume being the same as that of the kilogram to the liter.

Example 1

27.1 parts of 1-amino-4-(4'-aminobenzoylamino)-benzene-2-carboxylic acid are dissolved in 350 parts of water with the addition of sodium hydroxide, the mixture is then acidified with 70 parts of hydrochloric acid of 30 percent strength and tetrazotization is carried out while cooling with ice in the usual manner with an aqueous solution of 13.8 parts of sodium nitrite. The tetrazotization product is then coupled in the presence of an excess of sodium carbonate first with 16 parts of 2-hydroxybenzene-1-carboxylic acid and then, after formation of the intermediate product with 39.5 parts of 2-phenylamino-8-hydroxynaphthalene-6:3'-disulfonic acid. This second coupling may be accelerated by the addition of a small amount of pyridine. When the coupling is finished, the dyestuff is separated by the addition of 15 parts of sodium chloride for every 100 parts by volume of reaction mixture. For conversion into its copper compound the dyestuff is dissolved at 80–85° C. in 3000 parts of water, first 15 parts of crystalline sodium acetate are added and 50 parts of acetic acid of 84 percent strength, and then 25 parts of crystalline copper sulfate dissolved in 100 parts of water, and then the whole is stirred for one hour at 80–85° C. The dyestuff, which is completely dissolved, is precipitated by the addition of 350 parts of sodium chloride. By filtration and drying, there is obtained a brown-black dyestuff powder, which dissolves in concentrated sulfuric acid with a red coloration and in water or dilute sodium carbonate solution with a brown coloration and dyes cotton brown tints which are fast to light.

A dyestuff having approximately the same properties is obtained as follows:

5-acetylamino-2-aminobenzoic acid is diazotized, and coupled in alkaline solution with 2-amino-8-hydroxynaphthalene-6:3'-disulfonic acid. The acetylamino group is then split off, the aminoazo-dyestuff is acylated with para-nitrobenzoyl chloride, the nitro group is reduced to an amino group, the amino group is diazotized and the diazo-compound is coupled with 2-hydroxybenzene-1-carboxylic acid. Coppering is carried out as described above, that is to say with 1 atomic proportion of copper per molecular proportion of disazo-dyestuff. Alternatively, the aminobenzoylamino-dyestuff may first be coppered, and the coupling with the hydroxybenzene carboxylic acid carried out finally.

By using, instead of 39.5 parts of 2-phenylamino-8-hydroxynaphthalene-6:3'-disulfonic acid, 35.9 parts of 2-phenyl-amino-8-hydroxynaphthalene-6-sulfonic acid-3'-carboxylic acid, there is obtained a copper complex which is relatively sparingly soluble, and which is advantageously converted into its sodium salt by suspending it in a small quantity of water and sodium carbonate. When dry, the dyestuff as such is a black powder which dissolves in concentrated sulfuric acid with a red coloration and in water with a brown coloration, and dyes cotton brown tints which are fast to light.

Further disazo-dyestuffs can be obtained in the manner described above from the tetrazo-compounds of the diamines given in column II of the following table, from the first components in column I and from the second components in column III, and complex copper compounds can be similarly obtained from these disazo-dyestuffs. These compounds also dye cellulose-containing fibers brown tints which are fast to light.

| | I<br>1st Coupling Component | II<br>Diamine | III<br>2nd Coupling component |
|---|---|---|---|
| 1 | 3-chloro-2-hydroxy-benzene-1-carboxylic acid. | 1-amino-4-(4'-aminobenzoylamino)-benzene-2-carboxylic acid. | 2-phenylamino-8-hydroxynaphthalene-6:3'-disulfonic acid. |
| 2 | 3-methyl-2-hydroxy-benzene-1-carboxylic acid. | do. | Do. |
| 3 | 1-hydroxybenzene-2-carboxylic acid. | do. | 2-(2'-methylphenylamino)-8-hydroxynaphthalene-6:4'-disulfonic acid. |
| 4 | do. | do. | 2-(4'-methylphenylamino)-8-hydroxynaphthalene-6:3'-disulfonic acid. |
| 5 | do. | do. | 2-(4'-chlorophenylamino)-8-hydroxynaphthalene-6:3'-disulfonic acid. |
| 6 | do. | 1-amino-4-(3'-methyl-4'-aminobenzoylamino)-benzene-2-carboxylic acid. | 2-phenylamino-8-hydroxynaphthalene-6:3'-disulfonic acid. |
| 7 | do. | 1-amino-4-(4'-amino-benzoylamino)-benzene 2-carboxylic acid. | 2-(4'-carboxymethoxyphenylamino)-8-hydroxynaphthalene-6-sulfonic acid. |

Finally, there can also be made in the manner described above the copper complex of the disazo-dyestuff from diazotized 4-hydroxy-4'-(4''-aminobenzoylamino)-1:1'-azobenzene-3:3''-dicarboxylic acid and 2-phenylamino-8-hydroxynaphthalene-6:3'-disulfonic acid.

*Example 2*

25.7 parts of 1-amino-2-methoxy-4-(4'-aminobenzoylamino)-benzene are tetrazotized and coupled in an alkaline solution first with 13.8 parts of 1-hydroxybenzene-2-carboxylic acid, and then with 39.5 parts of 2-phenylamino-8-hydroxynaphthalene-6:3'-disulfonic acid. The dyestuff is isolated, then redissolved in water and stirred for 8 hours at 80–90° C. with the addition of an aqueous solution of 55 parts of crystalline copper sulfate in ethanolamine. The dyestuff is salted out and filtered off. In the dry state it is a dark powder which in aqueous solution dyes cotton brown tints which are fast to light.

By dissolving the dyestuff, acidifying the solution to a pH value of 2.0 with hydrochloric acid, stirring the mixture for 1 hour while hot, filtering, and then converting the dyestuff into its sodium salt, there is obtained a dyestuff which in aqueous solution likewise dyes cotton brown tints which are fast to light. By after-coppering on the fiber the fastness to light is further increased.

*Example 3*

Diazotized 4-nitro-2-methoxy-1-aminobenzene is coupled in alkaline solution with 2-phenylamino-8-hydroxynaphthalene-6:3'-disulfonic acid, the product is reduced with sodium sulfide, acylated with 4-nitrobenzoyl chloride, again reduced with sodium sulfide, diazotized, and then coupled with 1-hydroxybenzene-2-carboxylic acid in alkaline solution. The previously isolated dyestuff is then stirred at 80° C. as described in the preceding example with copper sulfate in aqueous solution with the addition of ethanolamine, the dyestuff is separated by filtration, suspended in water, the mixture is acidified to a pH value of 3.0 with hydrochloric acid, stirred for 2 hours at 80° C., filtered, and the dyestuff is converted into its sodium salt. This dyestuff dyes cotton from aqueous solution brown tints which are fast to light.

*Example 4*

440 parts of the dyestuff of the formula

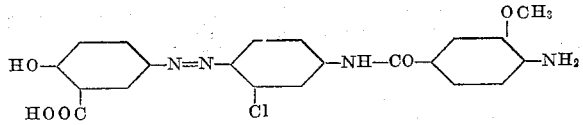

which is obtained by acylating 2-chloro-4-amino-4'-hydroxy-1:1'-azobenzene-3'-carboxylic acid with 3-methoxy-4-nitrobenzoyl chloride followed by reduction with sodium sulfide, are diazotized and then coupled with 395 parts of 2-phenylamino-8-hydroxynaphthalene-6:3'-disulfonic acid in a solution rendered alkaline with sodium carbonate. The dyestuff is precipitated with sodium chloride, filtered off, then suspended in an ammoniacal solution of 525 parts of crystalline copper sulfate, and the mixture is heated under reflux for 8 hours at 80° C. The dyestuff is again filtered off, suspended in hydrochloric acid of 5 percent strength, and the whole is stirred for 2 hours at room temperature. The greater part of the hydrochloric acid is then neutralized with sodium carbonate and the mixture is buffered with sodium acetate until a drop of the suspension applied to Congo paper only just still produces a violet coloration. Finally the whole is heated for 2 hours at 80° C., filtered, and the filter residue is dried. The dyestuff is soluble in sodium carbonate solution with a brown coloration and dyes cotton brown tints from such a solution. The dyeing is remarkably fast to light, and the dyestuff has a good levelling capacity.

*Example 5*

100 parts of cotton are entered at 40° C. into a dyebath which contains in 3000 parts of water 1 part of the cupriferous dyestuff obtainable as described in the first paragraph of Example 1, and dyeing is carried on for 1 hour while increasing the temperature to 90° C. 30 parts of crystalline sodium sulfate are then added, and dyeing is continued for a further ½ hour at 90–95° C. The cotton is then rinsed and finished in the usual manner. It is dyed brown, and the dyeing is distinguished by a very good fastness to light.

What is claimed is:

1. A dyestuff selected from the group consisting of an azo dyestuff and a complex copper compound of said azo dyestuff, the azo dyestuff having the formula

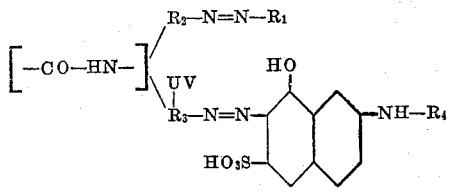

in which $R_1$ represents the radical of a hydroxybenzene-ortho-carboxylic acid, $R_2$ and $R_3$ represent benzene radicals in which the carbon atoms bound to the azo linkage and the [—CO—HN—] group are separated from one another by at least one carbon atom, $R_4$ represents a benzene radical which contains a sulfonic acid group, and UV represents a substituent standing in ortho position to the azo linkage and selected from the group consisting of a hydroxyl group, a carboxyl group and a methoxy group.

2. A complex copper compound of the formula

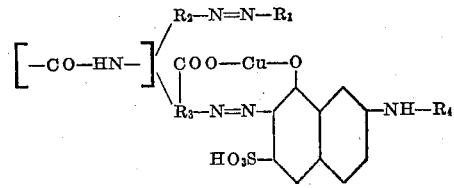

in which $R_1$ represents the radical of a hydroxybenzene-ortho-carboxylic acid, $R_2$ and $R_3$ represent benzene radicals in which the carbon atoms bound to the azo linkage and the [—CO—HN—] group are separated from one another by at least one carbon atom, $R_4$ represents a benzene radical which contains a sulfonic acid group, and the —COO— group stands in ortho-position to the azo linkage.

3. A complex copper compound of the formula

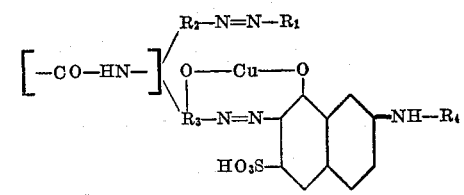

in which $R_1$ represents the radical of a hydroxybenzene-ortho-carboxylic acid, $R_2$ and $R_3$ represent benzene radicals in which the carbon atoms bound to the azo linkage and the [—CO—HN—] group are separated from one another by at least one carbon atom, $R_4$ represents a benzene radical which contains a sulfonic acid group, and the —O—Cu— group stands in ortho-position to the azo linkage.

4. A complex copper compound of the formula

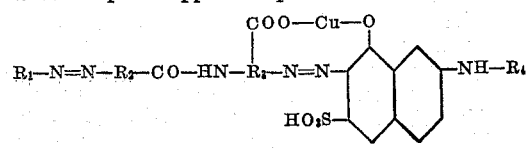

in which $R_1$ represents the radical of a hydroxybenzene-ortho-carboxylic acid, $R_2$ and $R_3$ represent benzene radicals in which the carbon atoms bound to the azo linkage and the [—CO—HN—] group are separated from one another by at least one carbon atom, $R_4$ represents a benzene radical which contains a sulfonic acid group, and the —COO— group stands in ortho-position to the azo linkage.

5. A complex copper compound of the formula

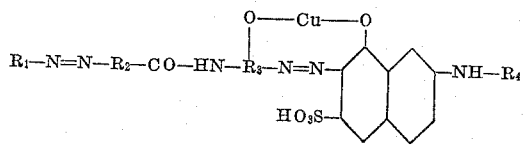

in which $R_1$ represents the radical of a hydroxybenzene-ortho-carboxylic acid, $R_2$ and $R_3$ represent benzene radicals in which the carbon atoms bound to the azo linkage and the [—CO—HN—] group are separated from one another by at least one carbon atom, $R_4$ represents a benzene radical which contains a sulfonic acid group, and the —O—Cu— group stands in ortho-position to the azo-linkage.

6. A complex copper compound of the formula

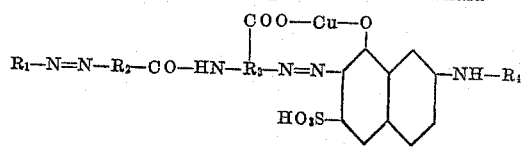

in which $R_1$ represents the radical of a hydroxybenzene-orthocarboxylic acid, $R_2$ and $R_3$ represent benzene radicals, the group —CO—HN— stands in para-position to the azo linkages, $R_4$ represents a benzene radical which contains a sulfonic acid group, and the —COO— group stands in ortho-position to the azo-linkage.

7. A complex copper compound of the formula

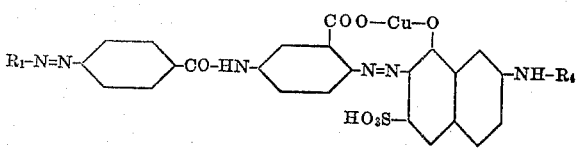

in which $R_1$ represents the radical of a hydroxybenzene-orthocarboxylic acid, $R_2$ and $R_3$ represent benzene radicals, the group —CO—HN— stands in para-position to the azo linkages, $R_4$ represents a benzene radical which contains a sulfonic acid group, and the —O—Cu— group stands in ortho-position to the azo-linkage.

8. A complex copper compound of the formula

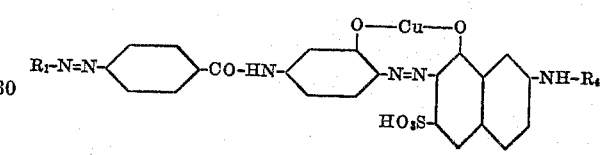

in which $R_1$ represents the radical of a hydroxybenzene-orthocarboxylic acid and $R_4$ represents a benzene radical which contains a sulfonic acid group.

9. A complex copper compound of the formula

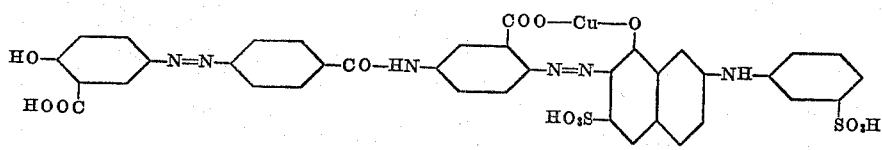

in which $R_1$ represents the radical of a hydroxybenzene-orthocarboxylic acid and $R_4$ represents a benzene radical which contains a sulfonic acid group.

10. The complex copper compound of the formula

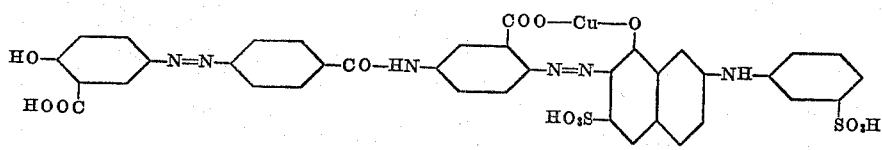

11. The complex copper compound of the formula

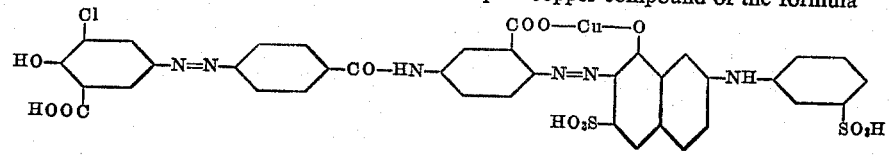

12. The complex copper compound of the formula

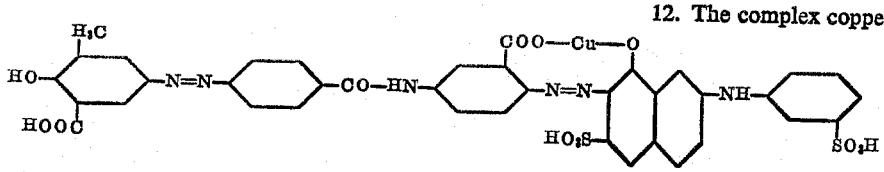

13. The complex copper compound of the formula

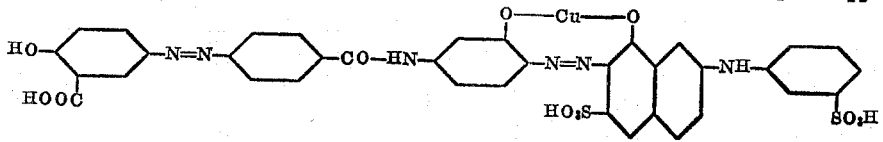

References Cited in the file of this patent
UNITED STATES PATENTS

| | | |
|---|---|---|
| 2,228,321 | Messmer | Jan. 14, 1941 |
| 2,673,200 | Ruckstuhl et al. | Mar. 23, 1954 |